(12) United States Patent
Eleftheriou et al.

(10) Patent No.: US 8,587,892 B2
(45) Date of Patent: Nov. 19, 2013

(54) METHOD AND APPARATUS FOR OPERATING A STORAGE DEVICE

(75) Inventors: Evangelos S. Eleftheriou, Rueschlikon (CH); Walter Haeberle, Rueschlikon (CH); Jens Jelitto, Rueschlikon (CH); Angeliki Pantazi, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/575,508

(22) PCT Filed: Jan. 27, 2011

(86) PCT No.: PCT/IB2011/050356
§ 371 (c)(1),
(2), (4) Date: Jul. 26, 2012

(87) PCT Pub. No.: WO2011/092642
PCT Pub. Date: Aug. 4, 2011

(65) Prior Publication Data
US 2012/0293889 A1    Nov. 22, 2012

(30) Foreign Application Priority Data
Jan. 28, 2010 (EP) .................................... 10151929

(51) Int. Cl.
*G11B 5/584* (2006.01)
(52) U.S. Cl.
USPC ..................................... 360/77.12; 360/78.02
(58) Field of Classification Search
USPC .............. 360/72.02, 77.12, 78.02, 51, 77.06, 360/77.03, 48, 55, 76, 75
See application file for complete search history.

(56) References Cited

U.S. PATENT DOCUMENTS

| 6,111,719 A * | 8/2000 | Fasen ........................ 360/73.04 |
| 6,169,640 B1 * | 1/2001 | Fasen ............................. 360/48 |
| 6,690,531 B2 * | 2/2004 | Richards et al. ............. 360/72.2 |
| 6,781,784 B2 * | 8/2004 | Peterson ........................ 360/76 |
| 7,529,061 B2 * | 5/2009 | Bui et al. ................... 360/77.12 |
| 2006/0103968 A1 | 5/2006 | Jurneke |

FOREIGN PATENT DOCUMENTS

| EP | 0 617 412 A2 | 7/2012 |
| WO | WO 01/75874 A2 | 10/2001 |

OTHER PUBLICATIONS

International Search Report from PCT/IB2011/050356, Jan. 27, 2011.

* cited by examiner

*Primary Examiner* — Ali Neyzari
(74) *Attorney, Agent, or Firm* — Scully, Scott, Murphy & Presser, P.C.; Gail H. Zarick, Esq.

(57) ABSTRACT

Method for operating a storage device with a tape and a head wherein the head comprises a first and a second read element. Each read element is operable to detect servo-pattern of a particular servo band. The first and the second read element are arranged such that the tape at first passes one of both read elements and subsequently passes the other of both read elements when the tape moves in a predetermined longitudinal direction. A tape transport direction of the tape along the longitudinal direction is determined. The first read element is selected dependent on the determined tape transport direction, when the determined tape transport direction represents a direction where the tape at first passes the first read element and subsequently the second read element. Otherwise the second read element is selected. A position error signal is determined dependent on the selected read element.

7 Claims, 5 Drawing Sheets

$$y = u \cdot P \qquad (F0)$$

$$y_{est} = u \cdot \hat{P} \qquad (F2)$$

$$d_1 = -PES1 + y \qquad (F4)$$

$$d_2 = -PES2 + y \qquad (F6)$$

$$d_{est} = -PES1 + u \cdot \hat{P} \qquad (F8)$$

$$d_{est} \cong -PES1 + u \cdot \hat{P}^* + \frac{L}{2}\vartheta \qquad (F10)$$

$$d_{est} \cong -PES2 + u \cdot \hat{P}^* - \frac{L}{2}\vartheta \qquad (F11)$$

$$A\overset{\Delta}{B}\Gamma: \quad \cos\vartheta = \frac{x}{\frac{D}{2}} \Rightarrow x = \frac{D}{2}\cos\vartheta \tag{F12}$$

$$\Gamma\overset{\Delta}{\Delta}E: \quad \sin\vartheta = \frac{\frac{D}{2}-x}{b} \Rightarrow b = \frac{\frac{D}{2}(1-\cos\vartheta)}{\sin\vartheta} \tag{F14}$$

$$\Delta\overset{\Delta}{Z}H: \quad \sin\vartheta = \frac{\Delta y_2}{b+\frac{L}{2}} \Rightarrow \Delta y_2 = \frac{D}{2}(1-\cos\vartheta) + \frac{L}{2}\sin\vartheta \tag{F16}$$

$$\Delta\overset{\Delta}{\Theta}I: \quad \sin\vartheta = \frac{\Delta y_1}{\frac{L}{2}-b} \Rightarrow \Delta y_1 = -\frac{D}{2}(1-\cos\vartheta) + \frac{L}{2}\sin\vartheta \tag{F18}$$

$$\Delta y_1 \cong \Delta y_2 \cong \frac{L}{2}\vartheta \tag{F20}$$

$$PES1 \cong \underbrace{y + \frac{L}{2}\vartheta}_{\cong y1} - d_1 \qquad PES2 \cong \underbrace{y - \frac{L}{2}\vartheta}_{\cong y2} - d_2 \tag{F22}$$

METHOD AND APPARATUS FOR OPERATING A STORAGE DEVICE

CROSS-REFERENCE TO RELATED APPLICATIONS

The present invention relates to and claims the benefit of the filing date of commonly-owned, co-pending PCT Patent Application No. PCT/IB2011/050356, filed Jan. 27, 2011, which further claims the benefit of priority date of commonly-owned, co-pending European Patent Application No. EP 10151929.6, filed on Jan. 28, 2010, the entire contents and disclosure of which is incorporated by reference as if fully set forth herein.

TECHNICAL FIELD

The present invention relates to a method and an apparatus for operating a storage device which comprises a tape and a head.

BACKGROUND OF THE INVENTION

U.S. Pat. No. 6,690,531 B2 discloses a data recording tape passing along guides and past a read/write head. Sensors detect the position of the tape and adjust the guides and the head as a function of the position. If the tape deviates from the target tape path, a controller moves a guide to steer the tape back to the target tape path, using the sensor signals.

US 2008/0117543 A1 describes that data bands are becoming increasingly smaller and closer together in order to increase the data band density and thereby increase data capacity of a given tape. Hence, it has become desirable to place the longitudinal defined servo bands at various locations across the full width of the tape, separated by groups of data bands. This allows the servo bands to be close to the data bands and limits offsets due to tape stretch, etc. This also allows a greater number of bands to be employed due to the greater precision of the relationship between the servo bands and the data bands. In this context, a tape drive is described including a head with a first and a second servo read element configured to detect transition stripes of a servo pattern on tape media. The first servo read element is configured to detect at least two transition stripes of an even servo band on the tape media at a first time. The second servo read element is configured to detect at least two transition stripes of an odd servo band on the tape media at a second time, wherein the second time is a time delay after the first time corresponding to a distance. A timing of at least two transition stripes of the even and of the odd servo band on the tape media is detected. The head is positioned laterally with respect to the tape media in response to the timing of the at least two transition stripes of the even and the odd servo band on the tape media.

SUMMARY OF THE INVENTION

According to embodiments of a first and second aspect of the invention, a method and a corresponding apparatus are provided for operating a storage device with a tape and a head wherein the head comprises a first read element and a second read element. Each read element is operable to detect predetermined servo patterns of a particular predetermined servo band being stored on the tape along a longitudinal expansion of the tape. The first and the second read element are arranged in such a way, that the tape at first passes one of both read elements and subsequently passes the other of both read elements when the tape moves in a predetermined longitudinal direction. A tape transport direction of the tape along the longitudinal direction is determined. The first read element is selected dependent on the determined tape transport direction when the determined tape transport direction represents a direction where the tape at first passes the first read element and subsequently the second read element. Otherwise the second read element is selected. A position error signal is determined dependent on the selected read element. The position error signal represents a lateral distance between a lateral position of the selected read element and a predetermined lateral reference position on the particular servo band. An estimated lateral track position representing the lateral reference position on the servo band with respect to a predetermined lateral reference point at a longitudinal position of the selected read element is estimated dependent on the determined position error signal. With respect to the predetermined lateral reference point another estimated lateral track position at a longitudinal position of the non-selected read element is estimated in such a way that the other estimated lateral track position becomes a time-delayed representation of the estimated lateral track position. A control signal is determined dependent on the estimated lateral track position. A lateral head position of the head is controlled via the control signal.

This may contribute to reliably estimating the particular lateral track position and to determine the control signal such that the head follows the servo band, in particular the lateral reference position on the servo band, as accurately as possible. This may also enable a control system where no external sensors are used and which may significantly improve a track-follow control especially in the case of low frequency lateral disturbances like for example stack shifts. This method and apparatus may be used to complement any control system for track-follow control. Track-follow control represents the controlling of the lateral head position with respect to the lateral reference position on the particular servo band being stored on the tape, thereby moving the head such that it follows the lateral reference position on the particular servo band as accurately as possible for example during read/write operations. The writing of the servo-pattern of the servo band is preferably done during manufacturing of the tape.

The longitudinal direction and a predetermined lateral direction serve as reference directions. Both directions are preferably perpendicular to each other. In this context, the term "lateral" corresponds to the lateral direction and the term "longitudinal" corresponds to the longitudinal direction.

The tape may be supplied by for example a supply-reel and taken up by for example a take-up reel. The tape transport may be triggered by actuating at least the take-up reel to move the tape in the tape transport direction. The tape may also move in lateral directions which can be identified as tape lateral motion. The tape lateral motion may for example result from debris accumulation on flanged rollers or from unevenly reeling or unreeling of the tape and may represent for example sudden lateral displacements of the tape.

The predetermined lateral reference position on the servo band represents a predetermined lateral position within a lateral extend of the servo patterns of the particular servo band. The lateral reference position is preferably related to a predetermined reference line, as for example a centerline of the particular servo band, positioned within the lateral extend of the servo patterns of the servo band. The estimated lateral track position represents an estimated lateral distance between the predetermined reference point and the lateral reference position on the servo band at the longitudinal position of the particular read element. The position error signal may be estimated dependent on the predetermined lateral reference position on the servo band and the current lateral position of the particular read element. The particular longitudinal position represents the position of the particular read element in longitudinal direction.

The first and second read element are preferably servo read elements. Each of the first and second read element may be elements being operable to detect the servo patterns of the particular servo band being associated to the first and second read element.

Lateral disturbances, originated at specific locations on a tape path typically propagate through the tape path from one point to the other. For example, in forward direction of the tape transport direction, where the tape at first passes for example the first read element, the lateral disturbance observed at the second read element is a time-delayed version of the disturbance at the first read element. This may contribute to reliably estimating the particular lateral track position at the particular read element.

In a preferred embodiment of the first and second aspect of the invention, the estimated lateral track position is estimated dependent on the control signal.

In a further preferred embodiment of the first and second aspect of the invention, an estimated lateral head position of the head is determined dependent on a predetermined model of an actuator of the storage device which is operable to move the head in lateral direction dependent on the control signal. The estimated lateral track position is determined dependent on the estimated lateral head position and the determined position error signal. The control signal is preferably applied on the actuator model and by this result in the estimated lateral head position. This may contribute to reliably estimating the particular lateral track position at the particular read element.

In a further preferred embodiment of the first and second aspect of the invention, a rotational head position of the head is determined which represents a deviation of a current alignment of the head from the longitudinal direction. The estimated lateral track position is estimated dependent on the determined rotational head position. The alignment of the head represents a position where the head is operable to read and/or write data from and respectively to the tape. The rotational head position may represent in particular a lateral difference between a first lateral position of the first read element to a second lateral position of the second read element. This may contribute to reliably estimating the particular lateral track position incorporating the current rotational position of the head.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

Different figures may contain identical references, representing elements with similar or uniform content.

DETAILED DESCRIPTION OF THE DRAWINGS

Figure 1:
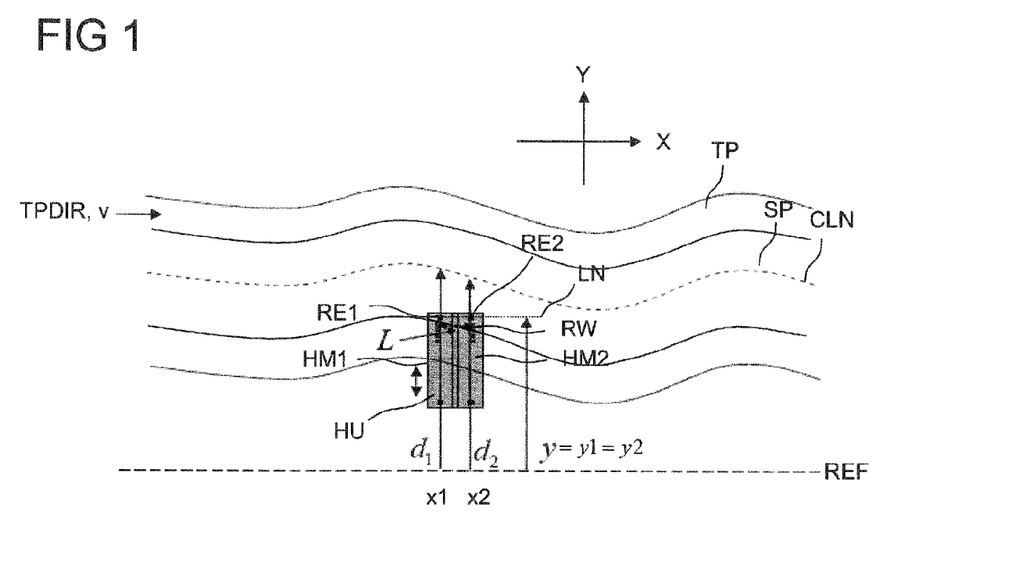
FIG. 1, an illustration of a head and a tape,
FIG. 2, an illustration of a control system,
FIG. 3, an illustration of an extended control system,
FIG. 4, equations,
FIG. 5, an illustration of a skewed head and a tape,
FIG. 6, an illustration of a control system for skew control of head,
FIG. 7, an illustration of a skewed head,
FIG. 8, further equations,
FIG. 9, a flow chart.

FIG. 1 shows a head HU, for example a magnetic head, of a storage device, as for example a tape drive. The head HU comprises at least a first and a second head module HM1, HM2. Each head module HM1, HM2 comprises at least one head element RW and at least one read element. A first read element RE1 is associated to the first head module HM1 and a second read element RE2 is associated to the second head module HM2. The particular head element RW is operable to read and/or write data from and respectively to a tape TP and may by way of example be a read/write transducer. The head HU is preferably moveable in a lateral direction Y.

A predetermined distance L, as for example 1200 μm, along a read element line LN between the first read element RE1 and the second read element RE2 is given. The read element line LN represents a reference line going through the first and the second read element RE1, RE2.

Figure 2:
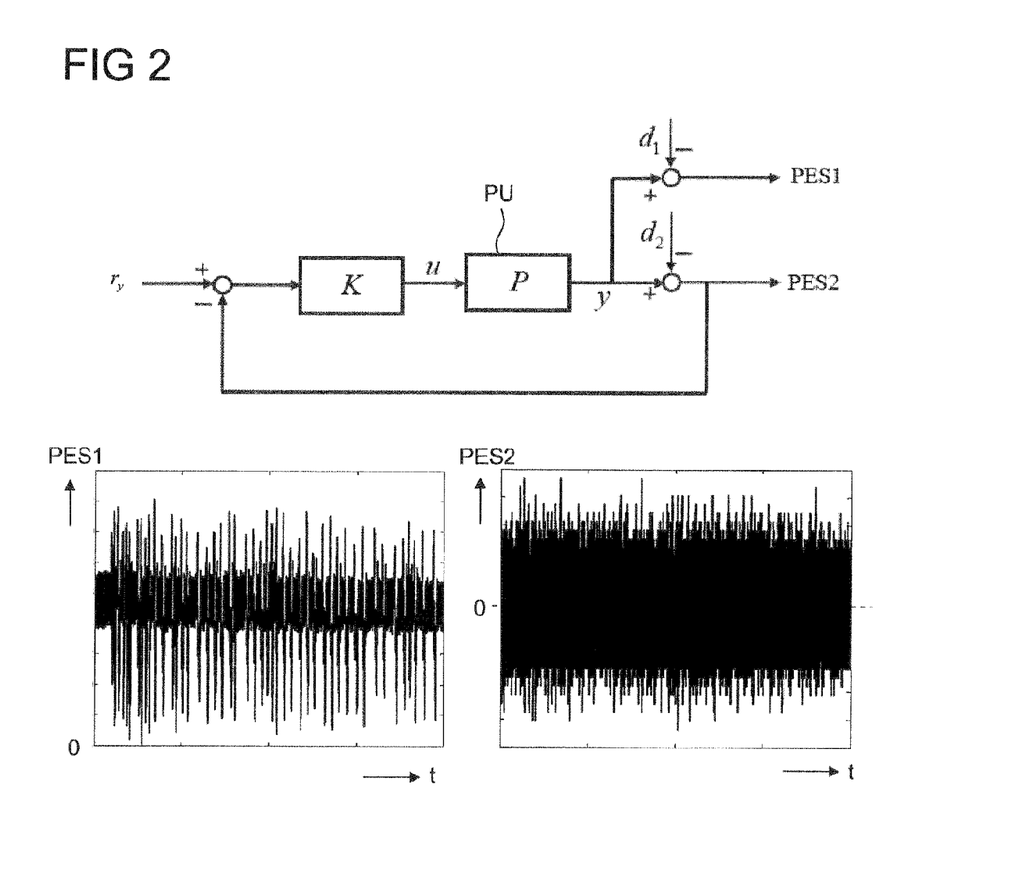

FIG. 2 shows an enlarged extract of the tape TP which comprises at least one servo band SP. The particular servo band SP is part or associated to data tracks which represent a tape area where actual data is stored and/or to be written to. The first and the second read element RE1, RE2 are typically positioned within a lateral extend of the servo band SP which is by way of example 200 um. The first and the second read element RE1, RE2 are preferably servo read elements and are associated to the particular servo band SP. Each read element RE1, RE2 is operable to detect predetermined servo patterns of the particular servo band SP. The first head module HM1 may for example comprise more than one first read element RE1 and the second head module HM2 may for example comprise more than one second read element RE2. Preferably the number of first read elements RE1 correlates to the number of second read elements RE2 wherein a pair of associated first and second read elements RE1, RE2 may be associated to a particular servo band.

The tape TP may move in a forward direction along a longitudinal direction X as shown in FIG. 1. The forward direction represents a tape transport direction TPDIR along the longitudinal direction X where the tape TP at first passes the first head module HM1 and subsequently the second head module HM2. A reverse direction of the tape TP represents a tape transport direction TPDIR along the longitudinal direction X where the tape TP at first passes the second head module HM2 and subsequently the first head module HM1.

In case, where the read element line LN is basically aligned in parallel to the longitudinal direction X, a lateral head position y is equal to a first lateral position y1 of the first read element RE1 and equal to a second lateral position y2 of the second read element RE2. The lateral head position y represents a lateral distance between the read element line LN and a predetermined reference point REF. The first lateral position y1 represents a lateral distance between the first servo element RE1 and the predetermined reference point REF and the second lateral position y2 represents a lateral distance between the second servo element RE1 and the predetermined reference point REF.

A first lateral track position $d_1$ represents a lateral distance between a predetermined lateral reference position $r_y$ on the servo band SP and the reference point REF at a first longitudinal position x1 which represents the longitudinal position of the first read element RE1. A second lateral track position $d_2$ represents a lateral distance between the predetermined lateral reference position $r_y$ on the servo band SP and the reference point REF at a second longitudinal position x2 which represents the longitudinal position of the second read element RE2.

Figure 4:
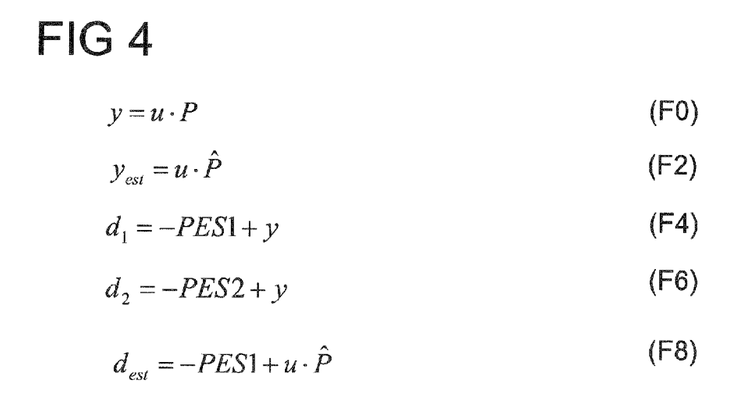

FIG. 2 shows a control system of the storage device, as for example a track-follow control system, configured to laterally move the head HU such that it follows a track centerline as accurately as possible during read/write operations. For that purpose, a first position error signal PES1 and a second position error signal PES2 are utilized. The first position error signal PES1 represents a lateral distance between the lateral head position y and the first lateral track position $d_1$, as also shown in equation F4 in FIG. 4. The second position error signal PES2 represents a lateral difference between the lateral head position y and the second lateral track position $d_2$ as shown in equation F6 in FIG. 4.

Preferably, a task of the control system is to control the lateral head position y in such a way, that the head HU follows the lateral reference position $r_y$ on the servo band SP in the presence of lateral motion disturbances that by way of example result from lateral tape motion of the tape TP. The lateral tape motion may be created by flanged roller transport between the supply-reel and the take-up reel. The flanges limit the lateral tape motion but introduce debris accumulation on the flanges that impacts a lifetime of the tape TP and in addition creates undesirable dynamic effects. In case of flangeless roller transport, there is no constraint on the lateral tape motion of the tape TP and lateral tape motion which may be introduced by stack shifts and thrown wraps are more pronounced. In a flangeless drive the amplitude of these disturbances is higher compared to a drive with flanged rollers. Stack shifts appear as a sudden lateral displacement repeated at the same longitudinal position each time the tape TP is running. The lateral tape motion is typically a low frequency disturbance, within a frequency range of for example 10 to 30 Hz. The lateral tape motion is typically a limiting factor to higher data track densities. For example, increasing areal density to 20 Gbit/$in^2$ may result in data track lateral widths of the order of 600 to 800 nm, which requires position error signal standard deviation of for example 30 to 50 nm. The particular head element RW is positioned with respect to the position of the associated read element RE1, RE2 in the head HU in such a way, that it be operable to read and/or write data from and respectively to the tape TP when the associated read element is basically aligned to the predetermined lateral reference position $r_y$ on the particular servo band.

The control system (FIG. 2) comprises a controller K which determines a control signal u dependent on a difference of the predetermined lateral reference position $r_y$, as for example 0 μm, and the second position error signal PES2.

The predetermined lateral reference position $r_y$ on the particular servo band SP represents a predetermined lateral position within a lateral extend, for example 200 um, of the servo pattern of the particular servo band SP. The lateral reference position $r_y$ is preferably related to a predetermined reference line, as for example a centerline CLN of the particular servo band SP, positioned within the lateral extend of the servo patterns of the servo band SP.

The control system further comprises the actuator PU which controls the lateral head to position y dependent on the control signal u. The lateral head position y may be determined as shown in equation F0 in FIG. 4, where the parameter P by way of example represents a gain of the actuator PU applied on the control signal u. The control signal u may for example be a current supplied to the actuator P.

In forward direction, the control system preferably controls the lateral head position y dependent on the second position error signal PES2 as shown in FIG. 2. In reverse direction, the lateral head position y is preferably controlled dependent on the first position error signal PES1.

A left diagram of FIG. 2 shows a course of the first position error signal PES1 versus the time t and a right diagram of FIG. 2 shows a course of the second position error signal PES2 versus the time t when the tape TP moves in forward direction. Values of the second position error signal PES2 vary around a value of 0 μm while values of the first position error signal PES1 vary around positive or negative values. The first position error signal PES1 representing in this case an open-loop position error signal is not incorporated in the control of the lateral head position y. Therefore, the first position error signal shows in comparison to the course of the second position error signal PES2, representing in this case a closed-loop position error signal, higher signal values. In reverse direction the behavior is typically swapped. For example in forward direction the second position error signal PES2 captured at the second longitudinal position x2 is basically a time-delayed version of the first position error signal PES1 captured at the first longitudinal position x1. Hence, the first position error signal PES1 as illustrated in the left diagram of FIG. 2 is used to estimate an estimated lateral track position $d_{est}$ representing the lateral reference position $r_y$ on the servo band SP as shown in equation F8 in FIG. 4. Another estimated lateral track position $d^*_{est}$ of the lateral reference position on the servo band SP is representing the time-delayed lateral track position $d_{est}$. The estimated lateral track position $d_{est}$ represents an estimated lateral distance between the predetermined reference point REF and the lateral reference position $r_y$ on the servo band SP at the longitudinal position of the particular read element.

In reverse direction, the second position error signal PES2 is preferably used to estimate the estimated lateral track position $d_{est}$. Preferably, the position error signal PES1, PES2 which is associated to the read element RE1, RE2 which is at first passed by the tape TP, is used for the estimation of the estimated lateral track position $d_{est}$. If the head HU comprises more than two head modules, the first and second head module HM1, HM2 represent the particular outer head modules of the head HU with respect to the longitudinal direction X.

Figure 3:
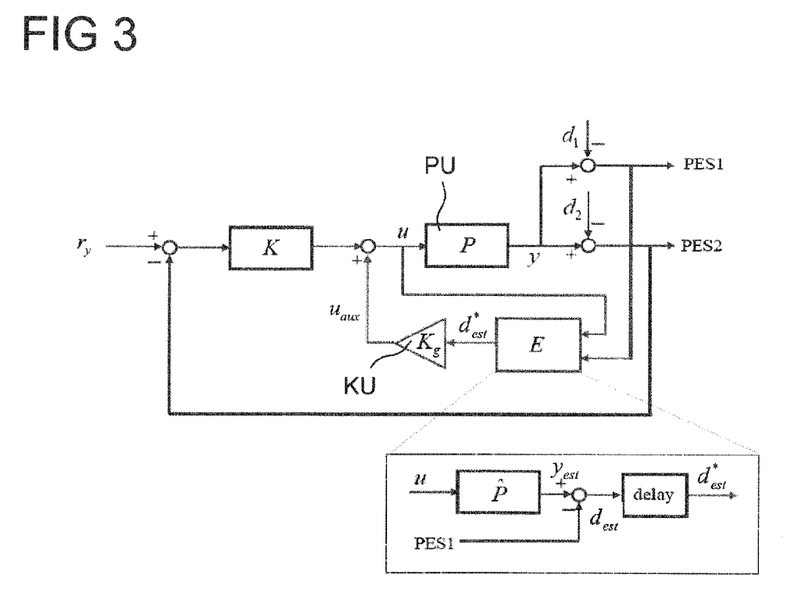

FIG. 3 shows an extended control system which additionally comprises an estimator E and an adaption unit KU, as for example an amplifier. FIG. 3 refers to the forward direction, where the estimated lateral track position $d_{est}$ of the lateral reference position $r_y$ on the servo band SP with respect to the reference point REF is estimated dependent on the first position error signal PES1 and the current control signal u. The other estimated lateral track position $d^*_{est}$ represents a time-delayed version of the estimated lateral track position $d_{est}$. The adaption unit KU is operable to determine an auxiliary control signal $u_{aux}$ by for example applying a predetermined gain $K_g$ to the other estimated lateral track position $d^*_{est}$. The auxiliary control signal $u_{aux}$ is then by way of example added to an output signal of the controller K to result in the control signal u. The estimator E comprises a predetermined actuator model $\hat{P}$ of the actuator PU which is operable to provide an estimated lateral head position $y_{est}$ dependent on the control signal u, as shown in F2 in FIG. 4. The estimated lateral head position $y_{est}$ represents an estimation of the current lateral head position y. A difference between the estimated lateral head position $y_{est}$ and the first position error signal PES1 represents the estimated lateral track position $d_{est}$ as shown in equation F8 in FIG. 4. In case of the reverse direction, a difference between the estimated lateral head position $y_{est}$ and the second position error signal PES2 represents the estimated lateral track position $d_{est}$.

Figure 5:
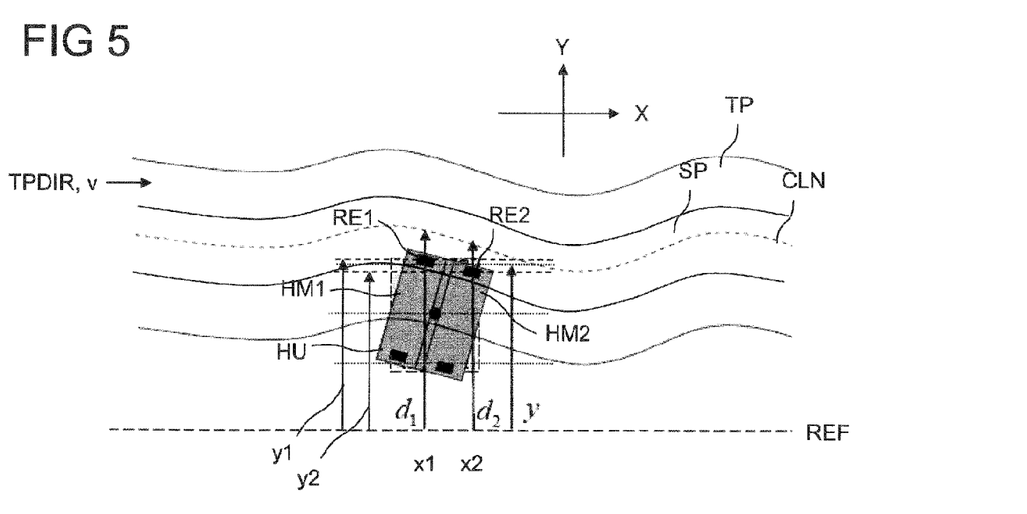

In comparison to FIG. 1, FIG. 5 shows a skewed head HU. In this context, the actuator PU is additionally operable to control a rotational position θ of the head HU. The rotational position θ of the head HU represents a deviation of a current alignment of the head HU from the longitudinal direction X. In this case, the first lateral position y1 differs from the second lateral position y2. The lateral head position y represents for example a mean value of the first and second lateral position y1, y2. Due to the difference between the first and second lateral position y1, y2, the rotational position θ of the head HU is preferably incorporated in the estimation of the estimated lateral track position $d_{est}$.

Figure 7:
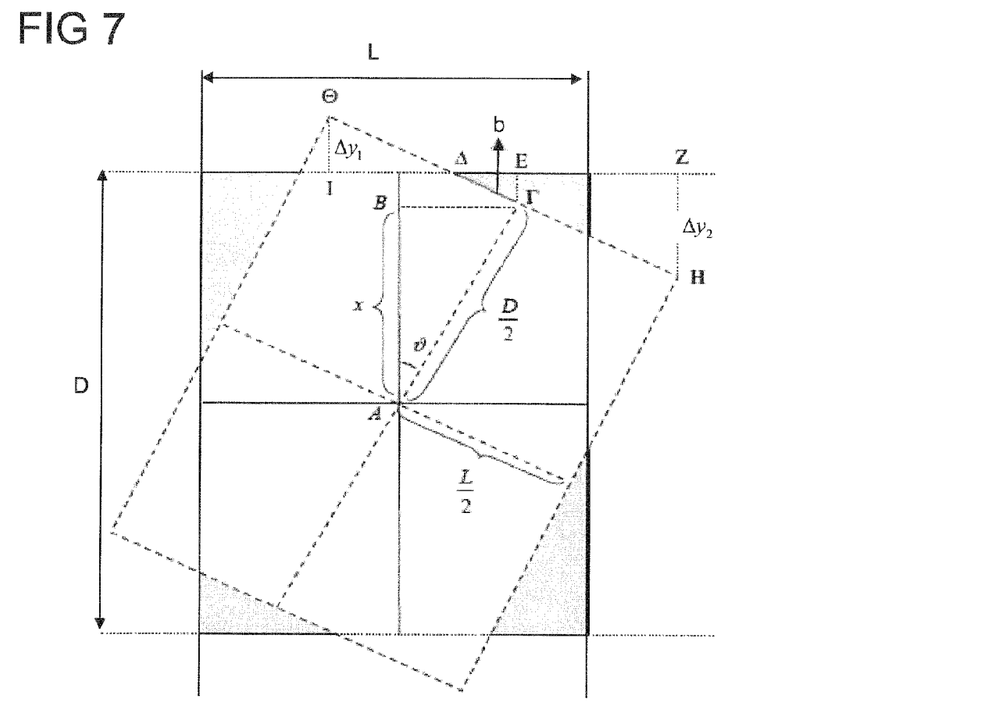
Figure 8:
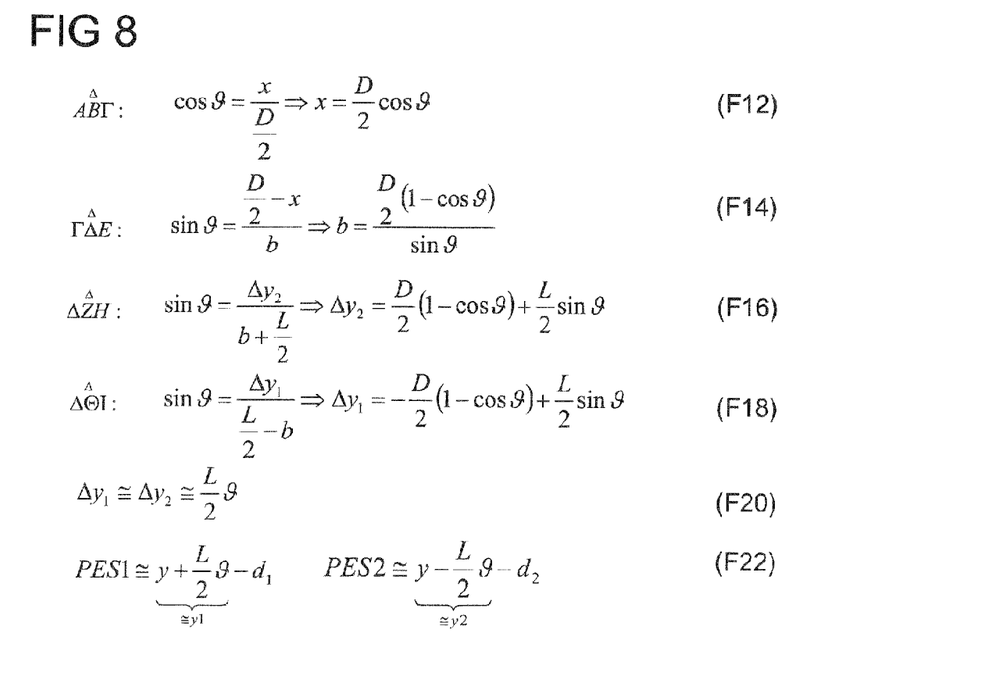

As shown in FIG. 7 a first lateral difference $\Delta y_1$ and a second lateral difference $\Delta y_2$ may for example be calculated dependent on trigonometrical relations. The first lateral difference $\Delta y_1$ represents the difference between the first lateral position y1 and the lateral head position y and the second lateral difference $\Delta y_2$ represents a difference between the actual second lateral position y2 and the lateral head position y. Equations F12, F14, F16, F18 show trigonometrical relations correlating to triangles $\hat{AB\Gamma}$, $\hat{\Gamma \Delta E}$, $\hat{\Delta ZH}$, $\hat{\Delta \Theta I}$. The head HU is characterized by its predetermined height D and the predetermined distance L between the first and the second read element RE1, RE2. By applying a small angle approximation on equations F16, F18 in FIG. 8, the first and the second lateral difference $\Delta y_1$, $\Delta y_2$ can be calculated based on equation F20 in FIG. 8. The first and the second position error signal PES1, PES2 may be calculated based on equation F22 in FIG. 8.

Figure 6:
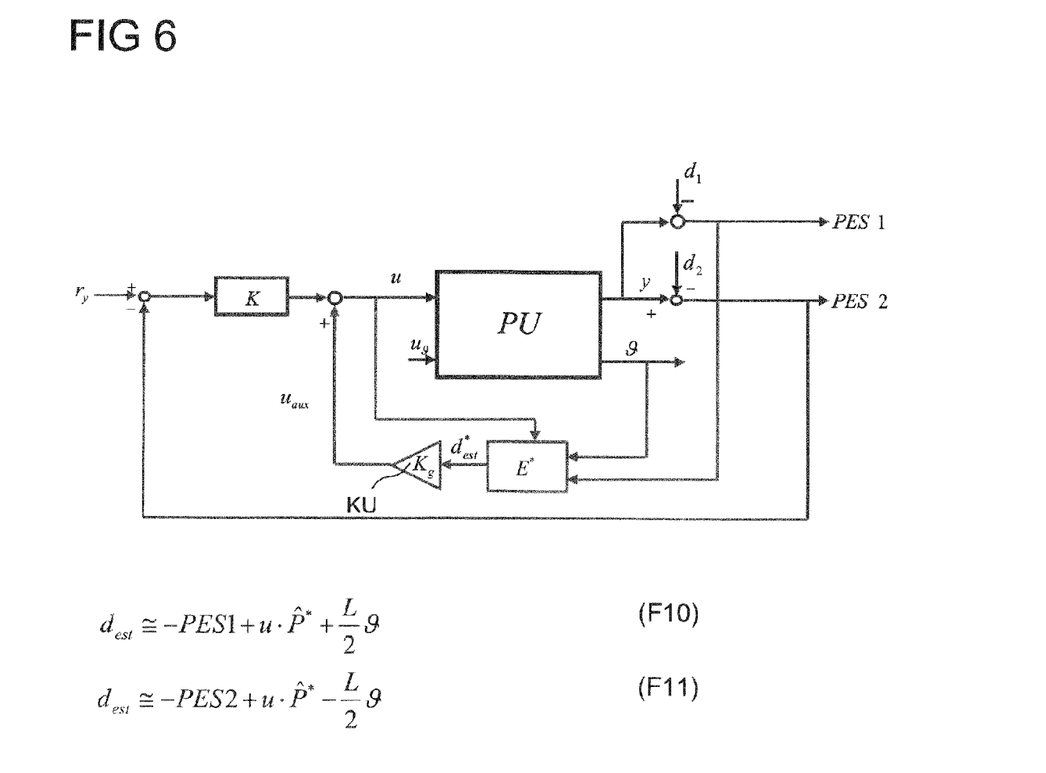

FIG. 6 shows an extended control system with implemented skew control of the head HU. In comparison to FIG. 3 the actuator PU is operable to additionally control the rotational position θ of the head HU dependent on a predetermined other control signal $u_\theta$. Furthermore, an extended estimator E* is implemented to estimate the lateral track position $d_{est}$ according to equation F10 in FIG. 6 dependent on the control signal u, the rotational position θ and the first position error signal PES1 in forward direction. The to estimation of the lateral track position $d_{est}$ may be based on an extended model $\hat{P}^*$ of the actuator PU with incorporated skew control of the head HU. In reverse direction, the estimated lateral track position $d_{est}$ is estimated dependent on the control signal u, the rotational position θ and the second position error signal PES2 according to equation F11 in FIG. 6. Equations F10, F11 result from corresponding rearrangements of equations F22 in FIG. 8.

Figure 9:
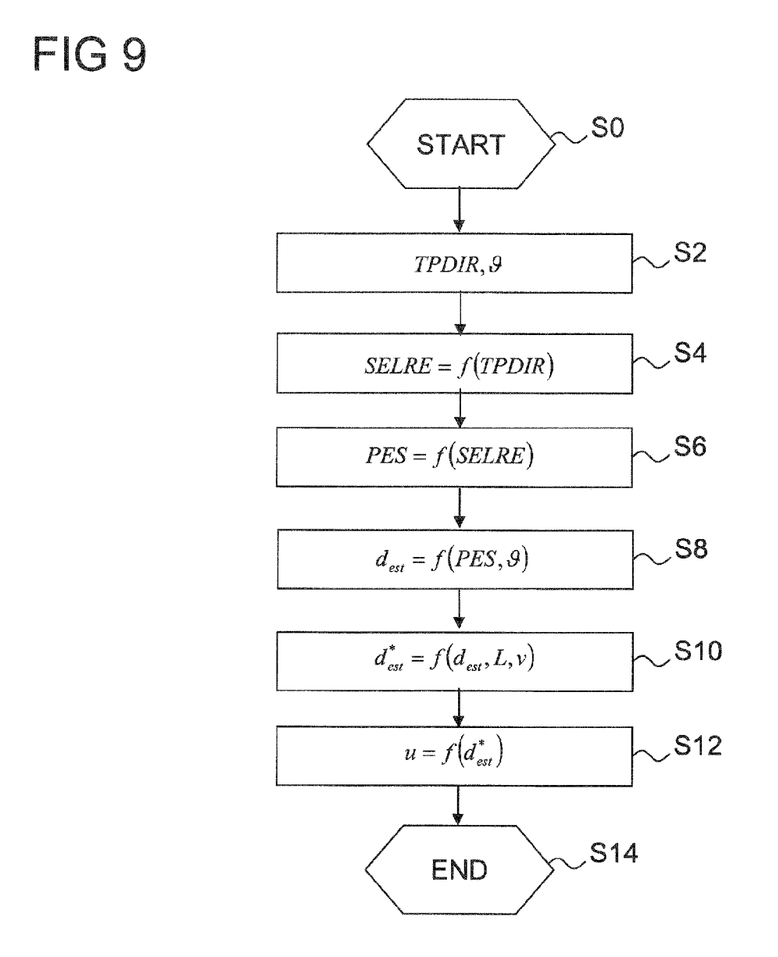

A program according to the flow chart of FIG. 9 is for example executed by a controller unit of the storage device, as for example a microcontroller. The controller unit may also be identified as an apparatus for operating the storage device.

The execution of the program starts in a step S0. In a step S2 the current tape transport direction TPDIR is determined. Additionally, the current rotational head position θ may be determined in step S2. In a step S4 a read element is selected dependent on the determined tape transport direction TPDIR. The selected read element SELRE can be either the first read element RE1 or the second read element RE2 depending on the read element being at first passed by the tape TP. The unselected read element is preferably incorporated as feedback for the particular control system to control the lateral head position y (FIG. 3, FIG. 6). For example, if the tape TP moves in forward direction, the first read element RE1 represents the selected read element SELRE and the second read element RE2 represents the non-selected read element. In reverse direction the second read element RE2 is selected and the first read element RE1 unselected. In a step S6 a position error signal PES is determined. The position error signal is preferably associated to the selected read element SELRE and may represent either the first or the second position error signal PES1, PES2. In a step S8 the estimated lateral track position $d_{est}$ is estimated dependent on the determined position error signal PES. Additionally, the rotational head position θ is incorporated in the estimation of the estimated lateral track position $d_{est}$. The estimated lateral track position $d_{est}$ is estimated such, that it represents the lateral distance between the reference point REF and the lateral track position $d_1$, $d_2$ at the associated longitudinal position x1, x2 of the selected read element SELRE. In a step S10 the other estimated lateral track position $d^*_{est}$ is estimated dependent on the estimated lateral track position $d_{est}$, preferably in such a way, that the other estimated lateral track position $d^*_{est}$ represents the time-delayed version of the estimated lateral track position $d_{est}$. The time delay depends typically on a tape velocity v (FIG. 1) and on the predetermined distance L between the first and the second read element RE1, RE2. In a step S12 the control signal u is determined dependent on the other estimated lateral track position $d^*_{est}$. The execution of the software program stops in step S14. Preferably, the program execution restarts in step S2.

Although the invention has been described through some exemplary embodiments, the invention is not limited to such embodiments. It is apparent that those skilled in the art can make various modifications and variations to the present invention without departing from the scope of the present invention.

LIST OF REFERENCES $\hat{P}$ actuator model
$\hat{P}^*$ extended actuator model
θ rotational head position
$r_Y$ lateral reference position
$u_\theta$ other control signal
$u_{aux}$ auxiliary control signal
$d_{est}$, $d^*_{est}$ estimated lateral track position
$\Delta y_1$, $\Delta y_2$ lateral difference
$\hat{AB\Gamma}$, $\hat{\Gamma \Delta E}$, triangles
$\hat{\Delta ZH}$, $\hat{\Delta \Theta I}$
CLN centerline of servo band
D height of head
$d_1$, $d_2$ lateral track position
E estimator
E* extended estimator
HM1 first head module
HM2 second head module
HU head
K controller
$K_g$ gain
KU adaption unit
L distance between first and second read element
LN read element line
P actuator gain
PES, PES1, position error signal
PES2
PU actuator
RE1 first read element
RE2 second read element
REF reference point
RW head element
SELRE selected read element
SP servo band TP tape
TPDIR tape transport direction
u control signal
v tape velocity
X longitudinal direction
x, b auxiliary value
x1, x2 longitudinal position
y lateral head position
Y lateral direction
y1, y2 lateral positions
$y_{est}$ estimated lateral head position

The invention claimed is:

1. Method for operating a storage device with a tape (TP) and a head (HU) wherein the head (HU) comprises a first read element (RE1) and a second read element (RE2), wherein each read element (RE1, RE2) is operable to detect predetermined servo patterns of a particular predetermined servo band (SP) being stored on the tape (TP) along a longitudinal expansion of the tape (TP), wherein the first and the second read element (RE1, RE2) are arranged in such a way, that the tape (TP) at first passes one of both read elements (RE1, RE2) and subsequently passes the other of both read elements (RE1, RE2) when the tape (TP) moves in a predetermined longitudinal direction (X), wherein
 a tape transport direction (TPDIR) of the tape (TP) along the longitudinal direction (X) is determined,
 the first read element (RE1) is selected dependent on the determined tape transport direction (TPDIR), when the determined tape transport direction (TPDIR) represents a direction where the tape (TP) at first passes the first read element (RE1) and subsequently the second read element (RE2), and otherwise the second read element (RE2) is selected,
 a position error signal (PES1) is determined dependent on the selected read element wherein the position error signal (PES1) represents a lateral distance between a lateral position of the selected read element and a predetermined lateral reference position ($r_y$) on the particular servo band (SP),
 an estimated lateral track position ($d_{est}$) representing the lateral reference position ($r_y$) on the servo band (SP) with respect to a predetermined lateral reference point (REF) at a longitudinal position (x1) of the selected read element is estimated dependent on the determined position error signal (PES1),
 with respect to the predetermined reference point (REF) another estimated lateral track position ($d^*_{est}$) at a longitudinal position (x2) of the non-selected read element is estimated in such a way that the other estimated lateral track position ($d^*_{est}$) becomes a time-delayed representation of the estimated lateral track position ($d_{est}$),
 a control signal (u) is determined dependent on the other estimated lateral track position ($d^*_{est}$), wherein a lateral head position (y) of the head (HU) is controlled via the control signal (u).

2. Method according to claim 1, wherein
 a current transport velocity (v) of the tape (TP) in longitudinal direction (X) is determined,
 the time delay is determined dependent on the determined transport velocity (v).

3. Method according to claim 1, wherein the estimated lateral track position ($d_{est}$) is estimated dependent on the control signal (u).

4. Method according to claim 1, wherein
 an estimated lateral head position ($y_{est}$) of the head (HU) is determined dependent on a predetermined model ($\hat{P}$) of an actuator (PU) of the storage device which is operable to move the head (HU) in lateral direction (Y) dependent on the control signal (u),
 the estimated lateral track position ($d_{est}$) is determined dependent on the estimated lateral head position ($y_{est}$) and the determined position error signal (PES1).

5. Method according to claim 1, wherein
 an auxiliary control signal ($a_{aux}$) is determined dependent on a predetermined gain ($K_g$) being applied on the other estimated lateral track position ($d^*_{est}$) upon which the control signal (u) is determined.

6. Method according to claim 1, wherein
 a rotational head position (θ) of the head (HU) is determined which represents a deviation of a current alignment of the head (HU) from the longitudinal direction (X),
 the estimated lateral track position ($d_{est}$) is estimated dependent on the determined rotational head position (θ).

7. Apparatus for operating a storage device with a tape (TP) and a head (HU) wherein the head (HU) comprises a first read element (RE1) and a second read element (RE2), wherein each read element (RE1, RE2) is operable to detect predetermined servo patterns of a particular predetermined servo band (SP) being stored on the tape (TP) along a longitudinal expansion of the tape (TP), wherein the first and the second read element (RE1, RE2) are arranged in such a way, that the tape (TP) at first passes one of both read elements (RE1, RE2) and subsequently passes the other of both read elements (RE1, RE2) when the tape (TP) moves in a predetermined longitudinal direction (X), wherein the apparatus is operable
 to determine a tape transport direction (TPDIR) of the tape (TP) along the longitudinal direction (X),
 to select the first read element (RE1) dependent on the determined tape transport direction (TPDIR), when the determined tape transport direction (TPDIR) represents a direction where the tape (TP) at first passes the first read element (RE1) and subsequently the second read element (RE2), and to select the second read element (RE2) otherwise,
 to determine a position error signal (PES1) dependent on the selected read element wherein the position error signal (PES1) represents a lateral distance between a lateral position of the selected read element and a predetermined lateral reference position ($r_y$) on the particular servo band (SP),
 to estimate an estimated lateral track position ($d_{est}$) representing the lateral reference position ($r_y$) on the servo band (SP) with respect to a predetermined lateral reference point (REF) at a longitudinal position (x1) of the selected read element dependent on the determined position error signal (PES1),
 to estimate another estimated lateral track position ($d^*_{est}$) at a longitudinal position (x2) of the non-selected read element with respect to the predetermined reference point (REF) in such a way that the other estimated lateral track position ($d^*_{est}$) becomes a time-delayed representation of the estimated lateral track position ($d_{est}$),
 to determine a control signal (u) dependent on the other estimated lateral track position ($d^*_{est}$), wherein a lateral head position (y) of the head (HU) is controlled via the control signal (u).

* * * * *